US012633478B2

(12) United States Patent
Rhein

(10) Patent No.: US 12,633,478 B2
(45) Date of Patent: May 19, 2026

---

(54) CAPACITOR HARVESTER

(71) Applicant: Hubbell Incorporated, Shelton, CT (US)

(72) Inventor: David A. Rhein, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 256 days.

(21) Appl. No.: 18/207,366

(22) Filed: Jun. 8, 2023

(65) Prior Publication Data

US 2023/0402239 A1     Dec. 14, 2023

Related U.S. Application Data

(60) Provisional application No. 63/350,705, filed on Jun. 9, 2022, provisional application No. 63/383,999, filed on Nov. 16, 2022.

(51) Int. Cl.
| | |
|---|---|
| *H01H 33/662* | (2006.01) |
| *H01H 11/00* | (2006.01) |
| *H01H 33/14* | (2006.01) |
| *H01H 33/66* | (2006.01) |
| *H01H 33/664* | (2006.01) |
| *H01H 33/666* | (2006.01) |
| *H02H 9/00* | (2006.01) |
| *H02H 9/04* | (2006.01) |

(52) U.S. Cl.
CPC ...... *H01H 33/66207* (2013.01); *H01H 11/00* (2013.01); *H01H 33/143* (2013.01); *H01H 33/6606* (2013.01); *H01H 33/662* (2013.01);

*H01H 33/664* (2013.01); *H01H 33/666* (2013.01); *H02H 9/04* (2013.01); *H01H 2033/6623* (2013.01)

(58) Field of Classification Search
CPC ......... H01H 33/66207; H01H 33/6606; H01H 33/662; H01H 33/666; H01H 33/027; H01H 33/143; H01H 2033/6623; H01H 11/00; H01H 75/04; H01H 85/047; H02H 3/20; H02H 9/04; H02J 50/05
USPC ................................. 218/139, 118, 144, 145
See application file for complete search history.

(56) References Cited

U.S. PATENT DOCUMENTS

| | | | | |
|---|---|---|---|---|
| 4,027,123 A * | 5/1977 | Ihara | ...................... | H01H 33/14 |
| | | | | 361/13 |
| 7,285,743 B2 * | 10/2007 | Martin | ................. | H01H 33/027 |
| | | | | 218/138 |
| 10,014,139 B2 * | 7/2018 | Cary | ...................... | H01H 33/14 |
| 10,170,255 B1 * | 1/2019 | Glaser | ................. | H01H 33/168 |

(Continued)

OTHER PUBLICATIONS

PCT/US2023/24806 International Search Report and Written Opinion dated Sep. 14, 2023 (17 pages).

*Primary Examiner* — William A Bolton

(74) *Attorney, Agent, or Firm* — Michael Best & Friedrich LLP

(57) ABSTRACT

A circuit interrupting device including a vacuum interrupter, a capacitor, and an insulating housing. The vacuum interrupter includes a vacuum bottle and first and second contacts disposed within the vacuum bottle. The second contact is movable relative to the first contact between a closed position and an open position. The capacitor is electrically connected in parallel with the vacuum interrupter and wound around an outer surface of the vacuum bottle. The insulating housing encloses the capacitor and the vacuum interrupter.

17 Claims, 18 Drawing Sheets

(56)            References Cited

U.S. PATENT DOCUMENTS

| | | | |
|---|---|---|---|
| 10,453,633 B2* | 10/2019 | Wang | ............... H01H 33/66261 |
| 10,818,455 B2* | 10/2020 | Djogo | .............. H01H 33/66207 |
| 2002/0131230 A1* | 9/2002 | Potter | ...................... H01G 5/16 |
| | | | 361/277 |
| 2012/0145674 A1 | 6/2012 | Schellekens et al. | |
| 2012/0187089 A1 | 7/2012 | Chen et al. | |
| 2013/0228432 A1* | 9/2013 | Borgstrom | ........... H01H 31/023 |
| | | | 200/48 R |
| 2020/0028351 A1 | 1/2020 | Agliata et al. | |
| 2020/0161065 A1 | 5/2020 | Djogo | |
| 2021/0175032 A1 | 6/2021 | Barker et al. | |
| 2021/0327666 A1* | 10/2021 | Benkert | ........... H01H 33/66261 |

* cited by examiner

700

APPLY A FIRST DIELECTRIC MATERIAL LAYER TO
AN OUTER SURFACE OF THE VACUUM BOTTLE
705

WRAP A FIRST CAPACITOR PLATE AROUND THE VACUUM
BOTTLE
710

APPLY A SECOND DIELECTRIC LAYER AROUND THE
VACUUM BOTTLE
715

WRAP A SECOND CAPACITOR PLATE AROUND THE
VACUUM BOTTLE
720

ENCLOSE THE VACUUM BOTTLE, THE FIRST CAPACITOR
PLATE, AND THE SECOND CAPACITOR PLATE IN AN
INSULATING HOUSING
725

Utility
Pole

820

800

815

Crossarm Mounting

CAPACITOR HARVESTER

RELATED APPLICATIONS

This application claims the benefit of U.S. Provisional Patent Application No. 63/350,705, filed on Jun. 9, 2022 and U.S. Provisional Patent Application No. 63/383,999, filed on Nov. 16, 2022, the entire contents of which are hereby incorporated by reference.

FIELD

The present disclosure relates generally to energy harvesting.

SUMMARY

Electrical power distribution networks deliver power to various distribution transformers, which step down the power from a medium voltage level to a lower voltage that is provided to loads such as homes, businesses, etc. Such power distribution networks include various circuit interrupting devices, such as breakers, reclosers, and other switching devices., that control the flow of power throughout the network. As an example, a network circuit interrupting device, such as a recloser, may include and/or be implemented as a vacuum interrupter that includes opposing contacts moveable between an open position and a closed position.

When a particular circuit interrupting device is closed, known solutions such as current transformers or other series configuration devices are used to harvest power from the power distribution network for powering electronics (e.g., control circuits, actuators, sensors, etc.) included within the circuit interrupting device. However, when the circuit interrupting device is opened, flow of current through the harvesting current transformer is interrupted and, thus, no power is delivered to the electronics. Existing solutions for providing power to the electronics mentioned when the circuit interrupting device open implement bulky energy storage devices, such as batteries and electrolytic capacitors, for harvesting power from a power distribution network. However, such solutions take up large amounts of space and are limited with respect to energy storage capabilities.

A first aspect of the present disclosure provides a circuit interrupting device including a vacuum interrupter, a capacitor, and an insulating housing. The vacuum interrupter includes a vacuum bottle and first and second contacts disposed within the vacuum bottle. The second contact is movable relative to the first contact between a closed position and an open position. The capacitor is electrically connected in parallel with the vacuum interrupter and wound around an outer surface of the vacuum bottle. The insulating housing encloses the capacitor and the vacuum interrupter.

Another aspect of the present disclosure provides a recloser including a terminal configured to electrically connect the recloser to a power line included in a power distribution network and one or more electronic components. The recloser further includes a vacuum interrupter electrically connected between the terminal and the one or more electronic components, the vacuum interrupter including a first contact and a second contact movable relative to the first contact between a closed position and an open position. The recloser further includes a cylindrical capacitor electrically connected in parallel with the vacuum interrupter and an insulating housing that encloses the cylindrical capacitor and the vacuum interrupter.

Another aspect of the present disclosure provides a method of manufacturing a vacuum interrupter including a vacuum bottle enclosing first and second contacts. The method includes applying a first dielectric material layer to an outer surface of the vacuum bottle, wrapping a first capacitor plate around the vacuum bottle, wrapping a second capacitor plate around the vacuum bottle, and enclosing the vacuum bottle, the first capacitor plate, and the second capacitor plate in an insulating housing.

Other aspects of the application will become apparent by consideration of the detailed description and accompanying drawings.

DETAILED DESCRIPTION

Figure 1:
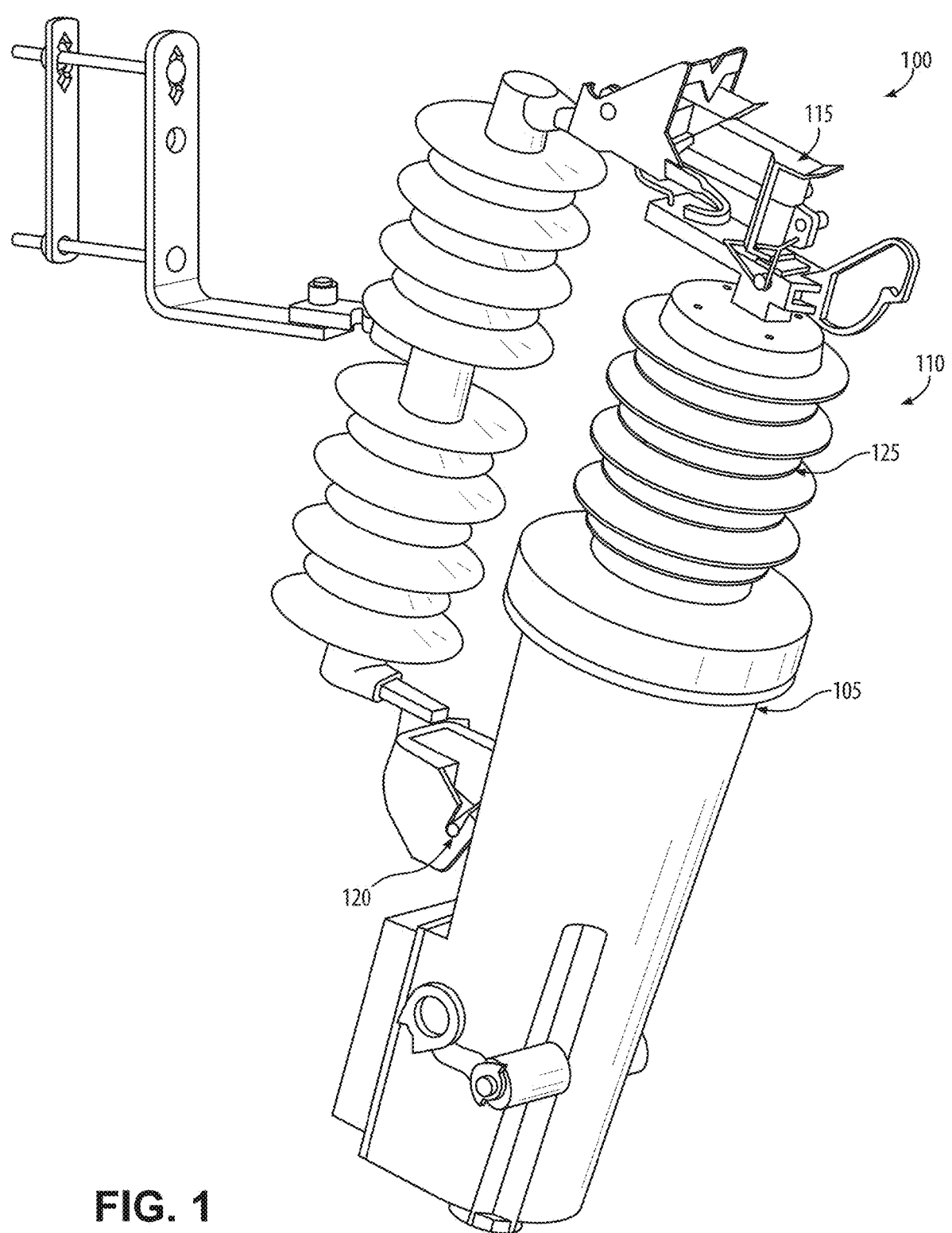
FIG. 1 illustrates a perspective view of a circuit interrupting device, such as a recloser, according to some aspects.

Before any embodiments of the application are explained in detail, it is to be understood that the application is not limited in its application to the details of construction and the arrangement of components set forth in the following description or illustrated in the following drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

FIG. 1 illustrates a circuit interrupting device, such as a recloser, 100 included in a power distribution network according to some examples. Although the circuit interrupting device is described herein as being implemented as a recloser 100, it should be understood that certain aspects of the recloser 100 may also be incorporated in other types of circuit interrupting devices that do not reclose, such as but not limited to non-reclosing circuit breakers and other types of switching devices included in a power distribution network.

The recloser 100 includes a housing 105 that contains and/or supports one or more components for electrically connecting and disconnecting the recloser 100 to and from a power distribution network. In the illustrated example, the housing 105 includes an upper housing portion that contains, for example, a vacuum interrupter 110 and a lower housing portion that contains, or otherwise supports, control electronics, an actuator, and/or various other electrical and mechanical components included in the recloser 100. The recloser 100 further includes first and second terminals 115, 120 that electrically connect the recloser 100 to a power line included in the power distribution network. In the illustrated example, the first, or upper, terminal 115 extends outward from a top surface of the vacuum interrupter 110 and the second, or lower, terminal 120 extends outward from a side surface of the lower portion of the housing 105.

Figure 2:
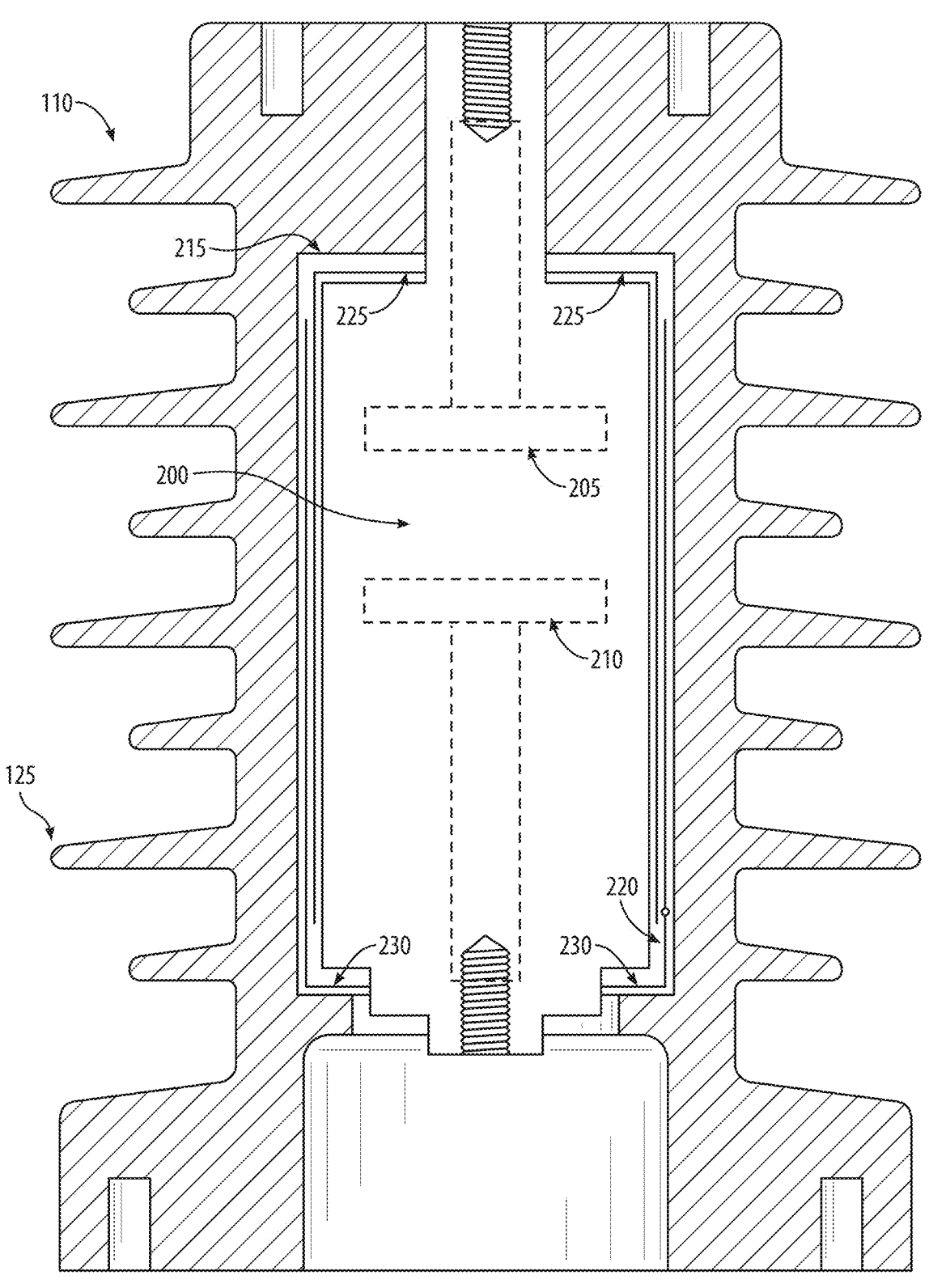
FIG. 2 illustrates a cross-sectional view of a vacuum interrupter, according to some aspects.

The vacuum interrupter 110 includes an insulating housing 125 that encloses, or contains, a vacuum bottle 200 (FIG. 2). The insulating housing 125 is formed of, for example, one or more insulating materials. The vacuum bottle 200 defines a vacuum chamber that encloses a fixed contact 205 and a moveable contact 210. The fixed contact 205 is electrically connected to the upper terminal 115 of the recloser 100 and the moveable contact 210 is electrically connected to the lower terminal 120 of the recloser 100. When the fixed and moveable contacts 205, 210 are in contact with each other (e.g., the vacuum interrupter 110 is closed), current flows from a power line of the power distribution network through the contacts 205, 210 of the vacuum interrupter 110. The current that flows through vacuum interrupter 110 while the contacts 205, 210 are in contact with each other is converted and used to power a load, such as one or more electronics included in the recloser 100. For example, one or more of a controller, control circuits, sensors, an actuator, communication devices, and/or other circuit components are powered with the converted line current that flows through the vacuum interrupter 110, for example, via a current transformer 315 (shown in FIG. 3).

When the fixed and moveable contacts 205, 210 are separated to open the vacuum interrupter 110 (as shown in FIG. 2), current does not flow through the contacts 205, 210 of the vacuum interrupter 110. Thus, there is no current flowing through the vacuum interrupter 110 that can be used to power the electronics included in the recloser 100 when the vacuum interrupter 110 is open. Accordingly, the present disclosure proposes electrically connecting a capacitor in parallel with the vacuum interrupter 110 to harvest energy from the power distribution network when the vacuum interrupter 110 is open.

Figure 3:
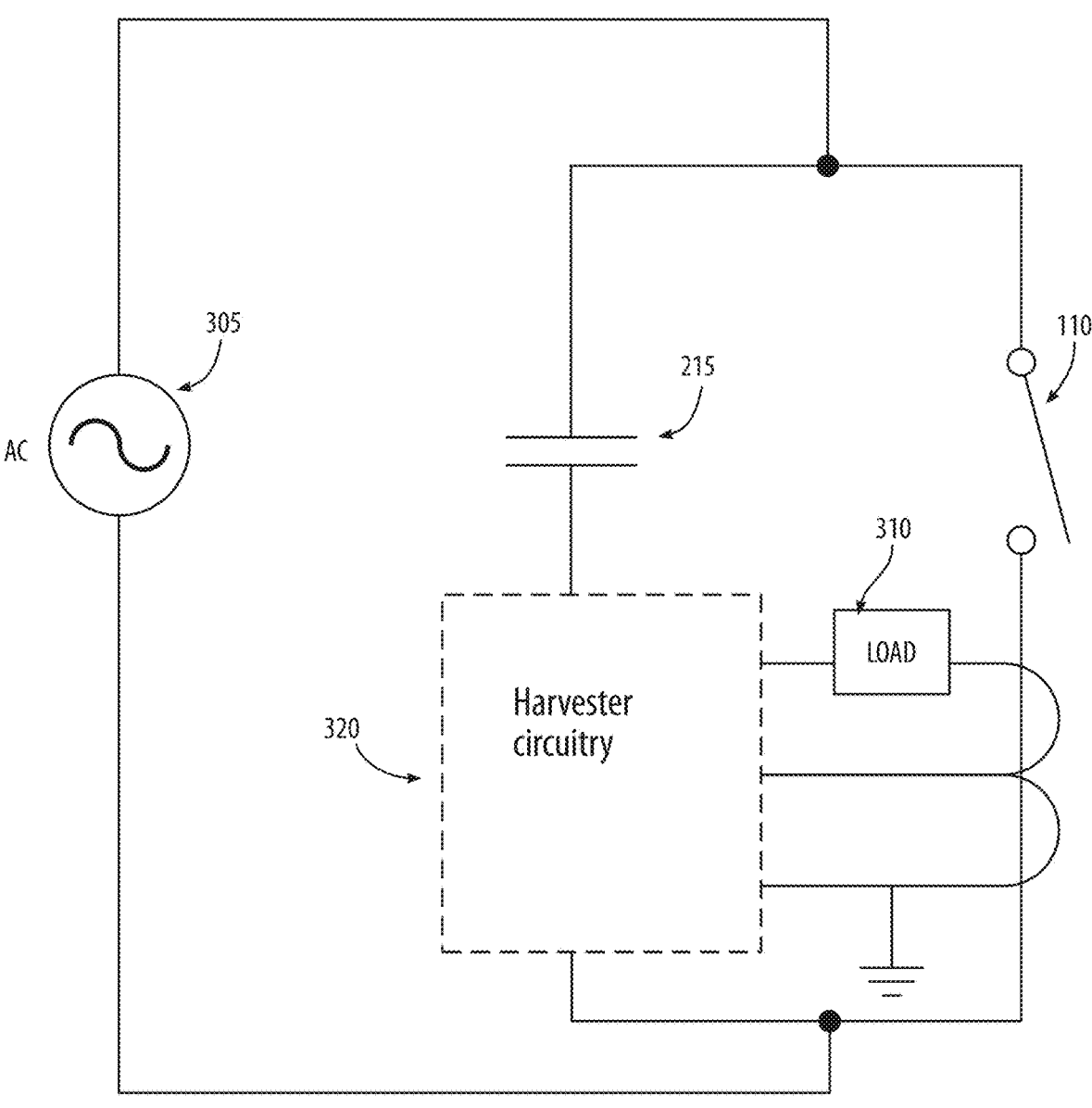
FIG. 3 illustrates a schematic of an energy harvesting circuit included in the recloser of FIG. 1, according to some aspects FIG. 4 a schematic of an energy harvesting circuit included in the recloser of FIG. 1, according to some aspects

FIG. 3 is a schematic diagram of the recloser 100 in which a high voltage, high impedance capacitor 215 is electrically connected in parallel with the vacuum interrupter 110. For example, the capacitor 215 and the vacuum interrupter 110 are electrically connected in parallel between a power line 305 included in the power distribution network and a load 310 that includes one or more of the electronics, such as a controller, sensors, an actuator, communication devices, and/or other circuit components included in the recloser 100. When the vacuum interrupter 110 is closed (e.g., the fixed and moveable contacts 205, 210 are in contact with each other), current flows from the power line 305 in the distribution network and through the lower impedance vacuum interrupter 110, as the impedance of vacuum interrupter 110 is much smaller, or less, than the impedance of the high voltage, high impedance capacitor 215. Moreover, current from the power line 305 does not flow through the capacitor 215 when the vacuum interrupter 110 is closed because the impedance of the vacuum interrupter 110 is much less than the impedance of the capacitor 215. That is, the vacuum interrupter 110 shorts the capacitor 215 when the vacuum interrupter 110 is closed. A current transformer 315 is connected in series with the vacuum interrupter 110 and provides power to the load 310 when the vacuum interrupter 110 is closed and conducting current.

When the vacuum interrupter 110 is open (e.g., the fixed and moveable contacts 205, 210 are separated), a relatively small current flows through the high voltage, high impedance capacitor 215 that is harvested for powering the load 310. For example, when the vacuum interrupter 110 is open, the capacitor 215 harvests, or conducts, AC current from the power line 305 and the harvester circuit 320 converts the harvested AC current into direct current (DC) current for powering the electronics included in the load 310.

Figure 4:
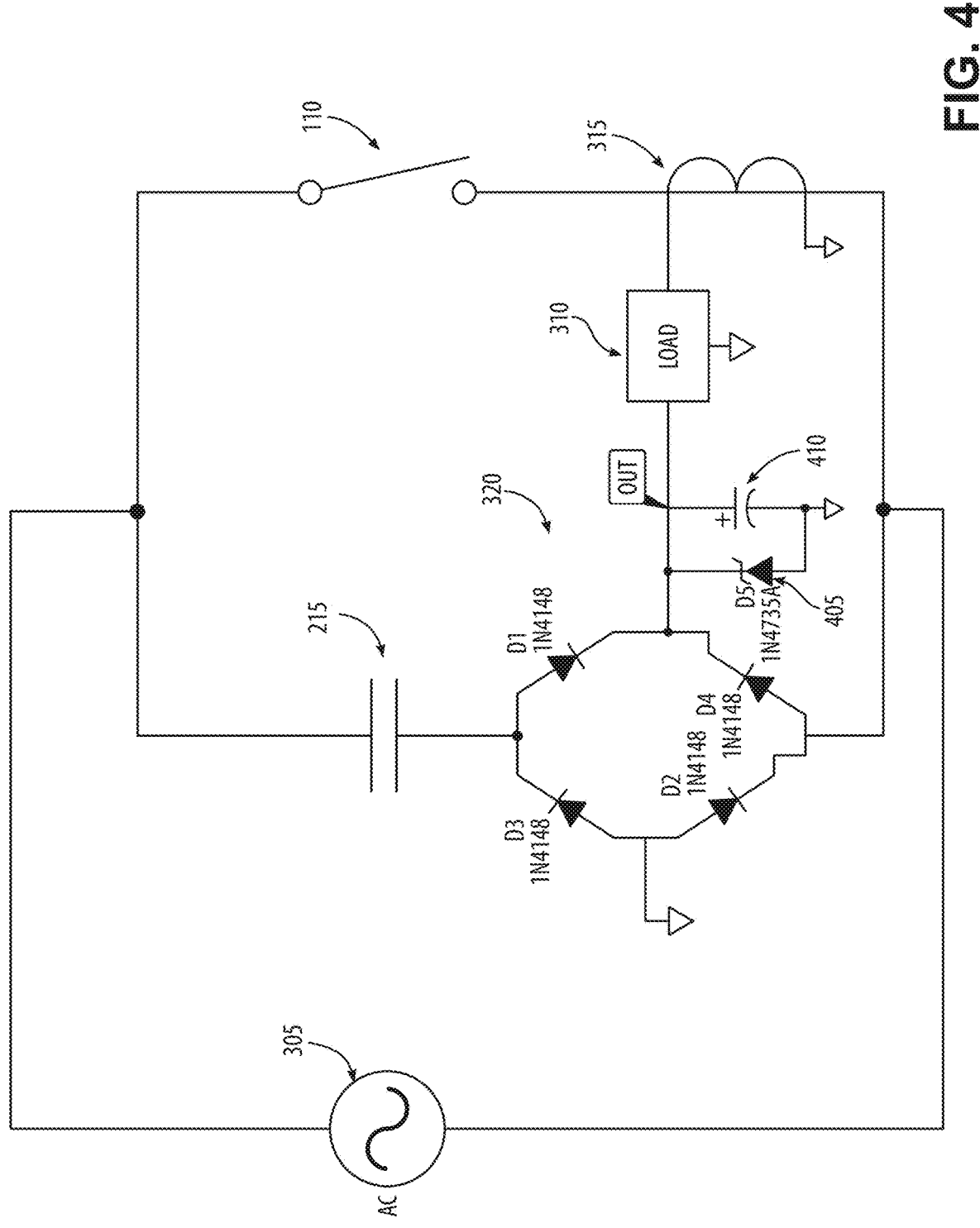

FIG. 4 illustrates an example circuit schematic in which the harvester circuit 320 includes a rectifier 400, a zener diode 405, and a load capacitor 410. The rectifier 400 converts the AC current output by the capacitor 215 into a DC current used for powering the load 310. In the illustrated example, the rectifier 400 is implemented as a diode bridge rectifier. However, it should be understood that in other examples, the rectifier 400 is implemented as a different type of rectifier circuit. The load capacitor 410 is charged by and powers the load 310 with DC current output by the rectifier 400. For example, the load capacitor 410 outputs power to the load 310 at a voltage level that is approximately equal to the breakdown voltage of the zener diode 405. In some instances, the load capacitor is implemented as an electrolytic capacitor. In other instances, the load capacitor 410 is replaced with a different type of energy storage device.

In some instances, the capacitor 215 and the vacuum interrupter 110 are integrated in a single package. For example, in some instances, the capacitor 215 is contained within the insulating housing 125 of the vacuum interrupter 110. In such instances, the capacitor 215 is located between an outer surface of the vacuum bottle 200 and an inner surface of the insulating housing 125 of the vacuum interrupter 110. Moreover, in such instances, the capacitor 215 is a cylindrical capacitor that is positioned to surround, or wrap around, the vacuum bottle 200 of the vacuum interrupter 110. For example, FIGS. 2, 5, and 6 illustrate an example in which the capacitor 215 is implemented as a cylindrical capacitor that is wrapped around the vacuum bottle 200 and disposed within an interior of the insulating housing 125.

Figure 18:
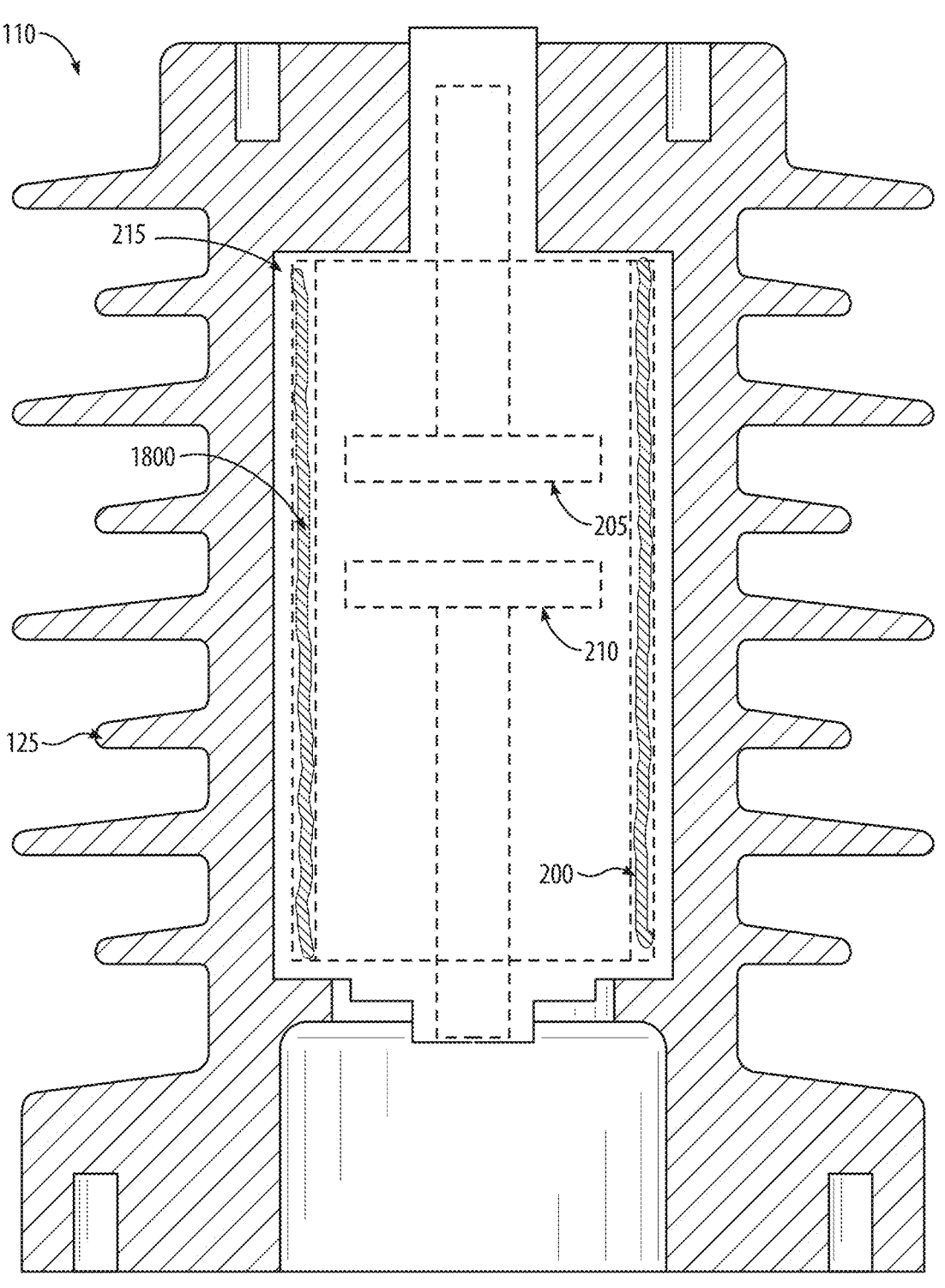
FIG. 18 illustrates a cross-sectional view of a vacuum interrupter, according to some aspects.

In other instances, the capacitor 215 is located between an insulating jacket, such as a silicone jacket, wrapped around an outer surface of the vacuum bottle 200 and an inner surface of the insulating housing 125 of the vacuum interrupter 110. Moreover, in such instances, the capacitor 215 is a cylindrical capacitor that is positioned to surround, or wrap around, the insulating jacket that is wrapped around, or otherwise disposed on, the vacuum bottle 200 of the vacuum interrupter 110. FIG. 18 illustrates an example in which an insulating jacket 1800 is wrapped around the vacuum bottle 200 before the capacitor 215 is installed, such that when installed, the capacitor 215 is disposed between an insulating jacket, such as a silicone jacket, wrapped around an outer surface of the vacuum bottle 200 and an inner surface of the insulating housing 125 of the vacuum interrupter 110.

As shown in FIG. 2, the capacitor 215 is formed of a dielectric material 220, a first cylindrical capacitor plate 225, and a second cylindrical capacitor plate 230. When the capacitor 215 is positioned within the vacuum interrupter 110, a layer of dielectric material 220 is formed between the outer surface of the vacuum bottle 200 and the insulating housing 125. The first and second cylindrical capacitor plates 225, 230 are spaced apart within the layer of dielectric material 220 such that the first and second capacitor plates 225, 230 wrap around the vacuum bottle 200 without contacting a surface of the vacuum bottle 200 or the insulating housing 125. That is, the capacitor 215 is formed such that the first cylindrical capacitor plate 225 is spaced apart from an outer surface of the vacuum bottle 200 and the second cylindrical capacitor plate 230 by the dielectric material 220. Similarly, the second cylindrical capacitor plate 230 is spaced apart from the first cylindrical capacitor plate 225 and an inner surface of the insulating housing 125 by the dielectric material 220.

Figure 5:
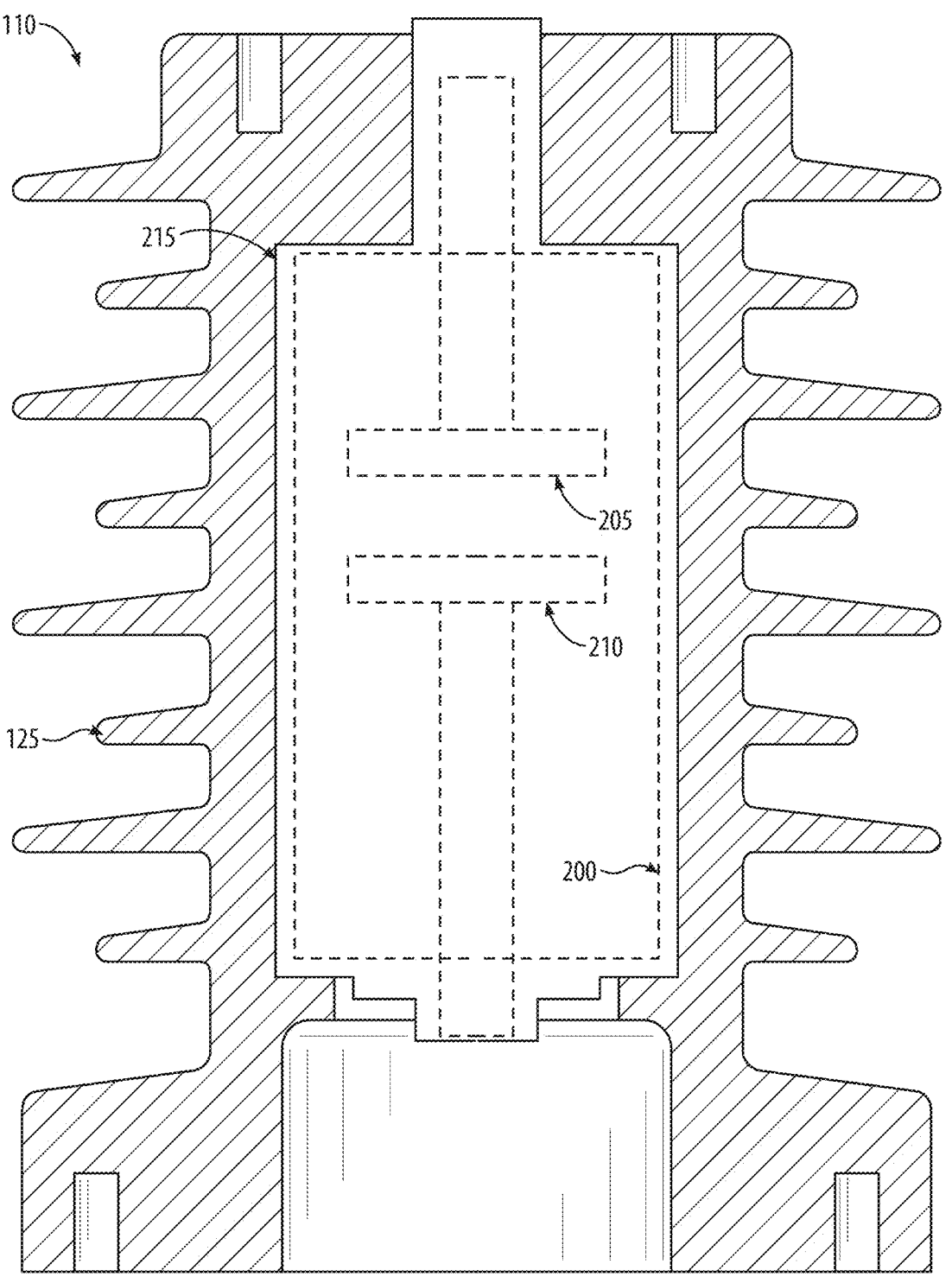
FIG. 5 illustrates a cross-sectional view of a vacuum interrupter, according to some aspects.
Figure 6:
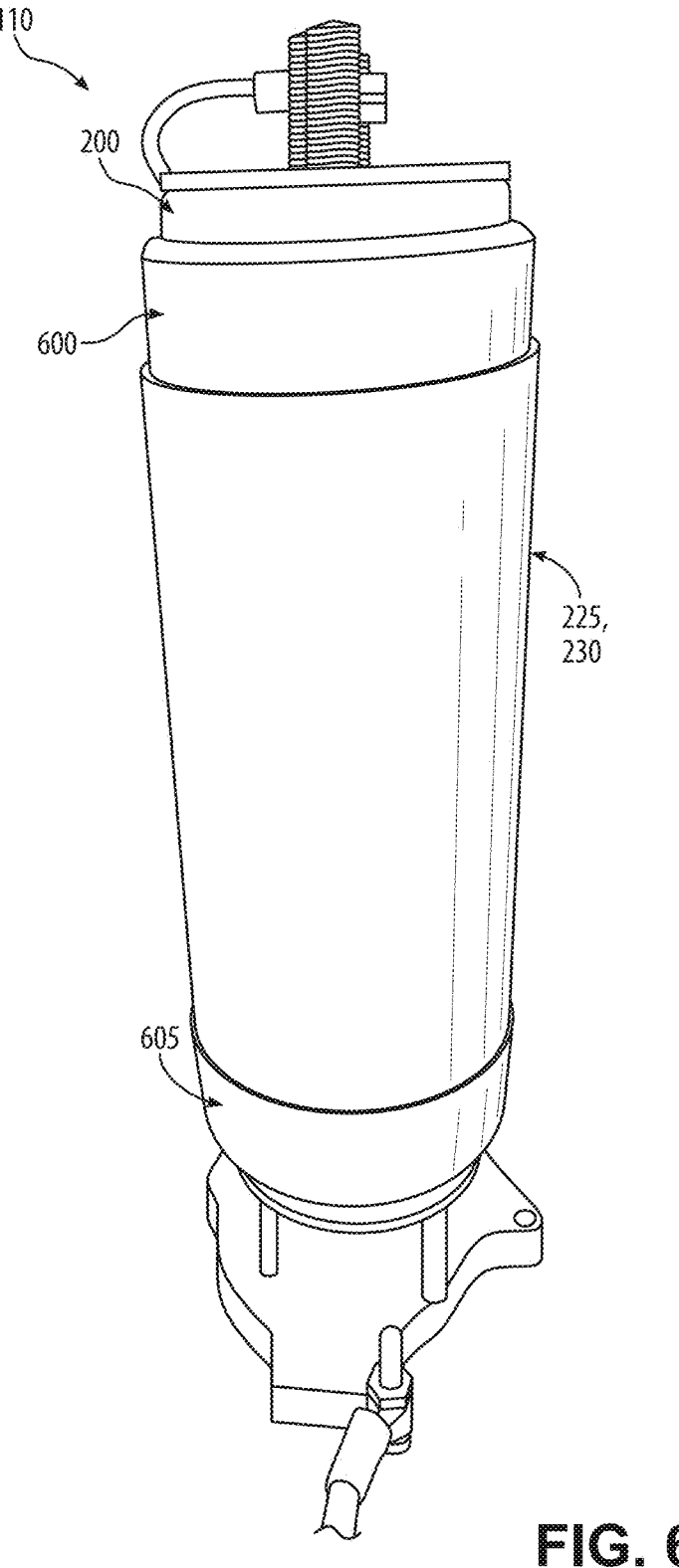
FIG. 6 illustrates a perspective view in which the insulating housing of the vacuum interrupter is removed, according to some aspects.

Accordingly, as shown in FIGS. 2 and 5, the vacuum interrupter 110 is constructed such that the capacitor 215 is disposed between the outer surface of vacuum bottle 200 and the insulating housing 125. Moreover, the capacitor 215 is electrically connected in parallel with the fixed and moveable contacts 205, 210 of the vacuum interrupter 110, as the first cylindrical capacitor plate 225 is electrically connected to the upper terminal 115 and the second cylindrical capacitor plate 230 is electrically connected to the harvester circuit 320 and/or the load 310. In the illustrated example of FIG. 18, an insulating jacket, such as a silicone jacket, 1800 is wrapped around, or otherwise disposed on, the outer surface of the vacuum bottle 200 such that the capacitor 215 is disposed between the insulating jacket 1800 and the insulating housing 125.

FIG. 6 illustrates a perspective view of the single package including the vacuum interrupter 110 and the capacitor 215 in which the insulating housing 125 has been removed. As shown, a first layer 600 of dielectric material 220 is wrapped around the vacuum bottle 200. The first and second cylindrical capacitor plates 225, 230 are wrapped around the first layer 600 of dielectric material 220, with a second layer (not shown) of dielectric material 220 disposed between the first and second cylindrical capacitor plates 225, 230. A third layer 605 of dielectric material 220 is formed on an outer surface of the second cylindrical capacitor plate 230 such that the third layer 605 separates the second cylindrical capacitor plate 230 from the insulating housing 125.

In some instances, the first and second capacitor plates 225, 230 are positioned within the vacuum bottle 200. In such instances, the size of the vacuum bottle 200 and cylindrical capacitor plates 225, 230 is increased, as the dielectric constant of a vacuum is much lower than the dielectric constant of the dielectric material 220 used to form the capacitor 215.

Figure 7:
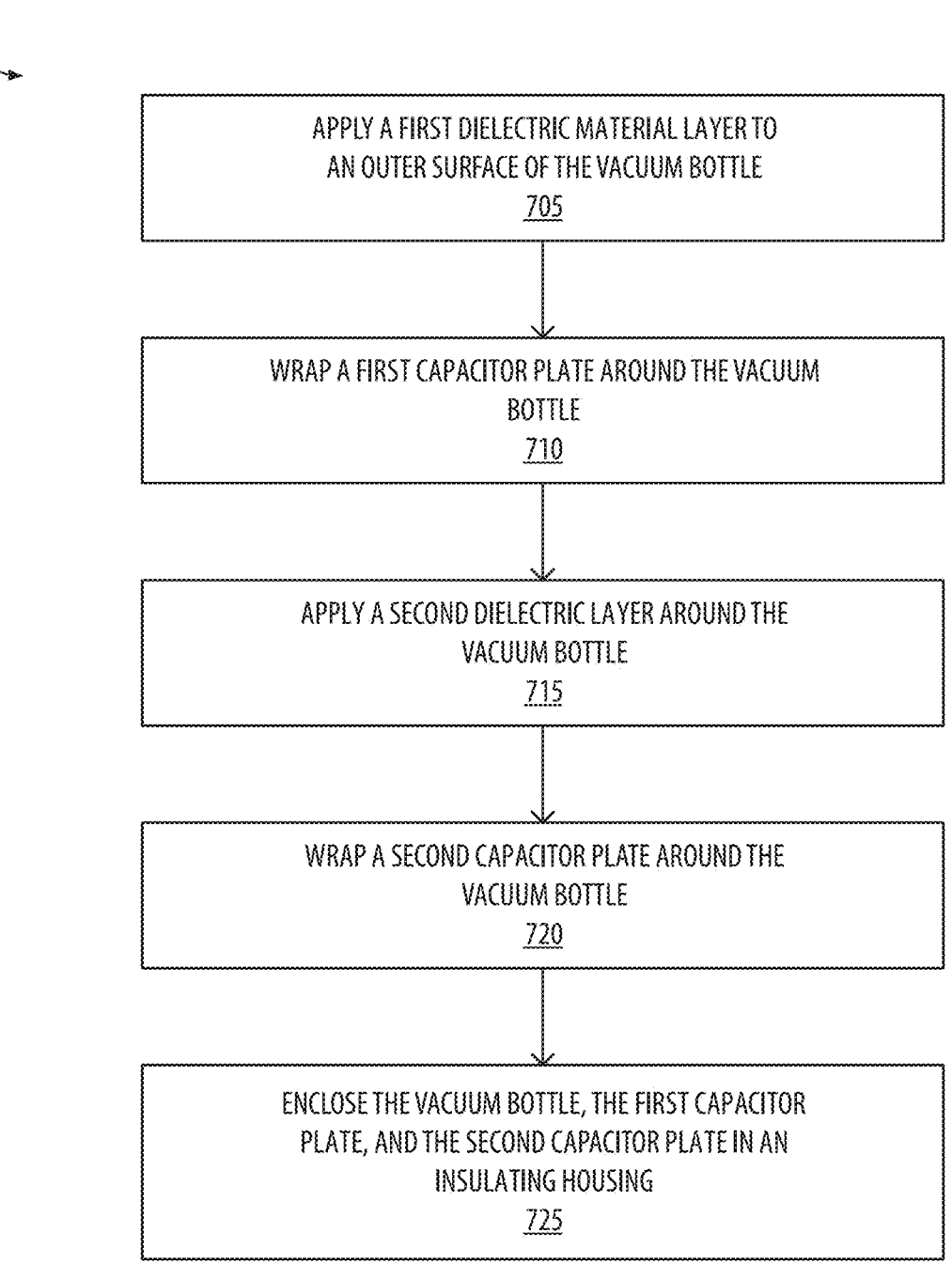
FIG. 7 is a flowchart illustrating a method for manufacturing a vacuum interrupter, according to some aspects.
Figure 8:
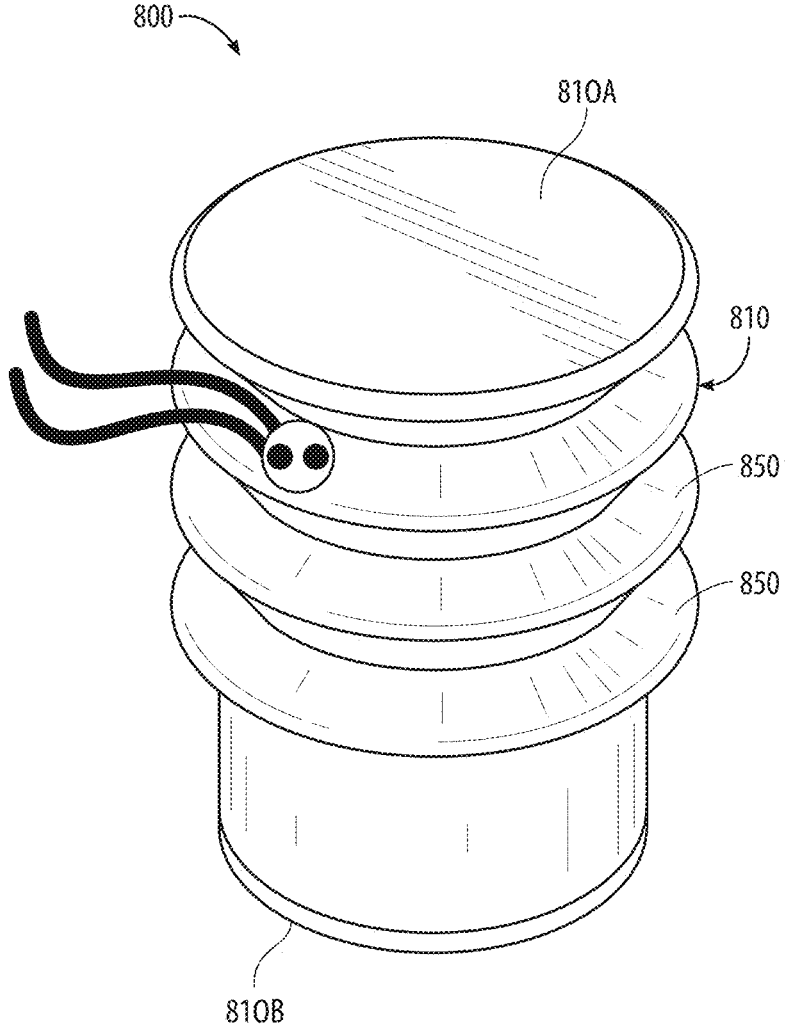
FIG. 8 illustrates a perspective view of a voltage harvesting device, according to some aspects.
Figure 9:
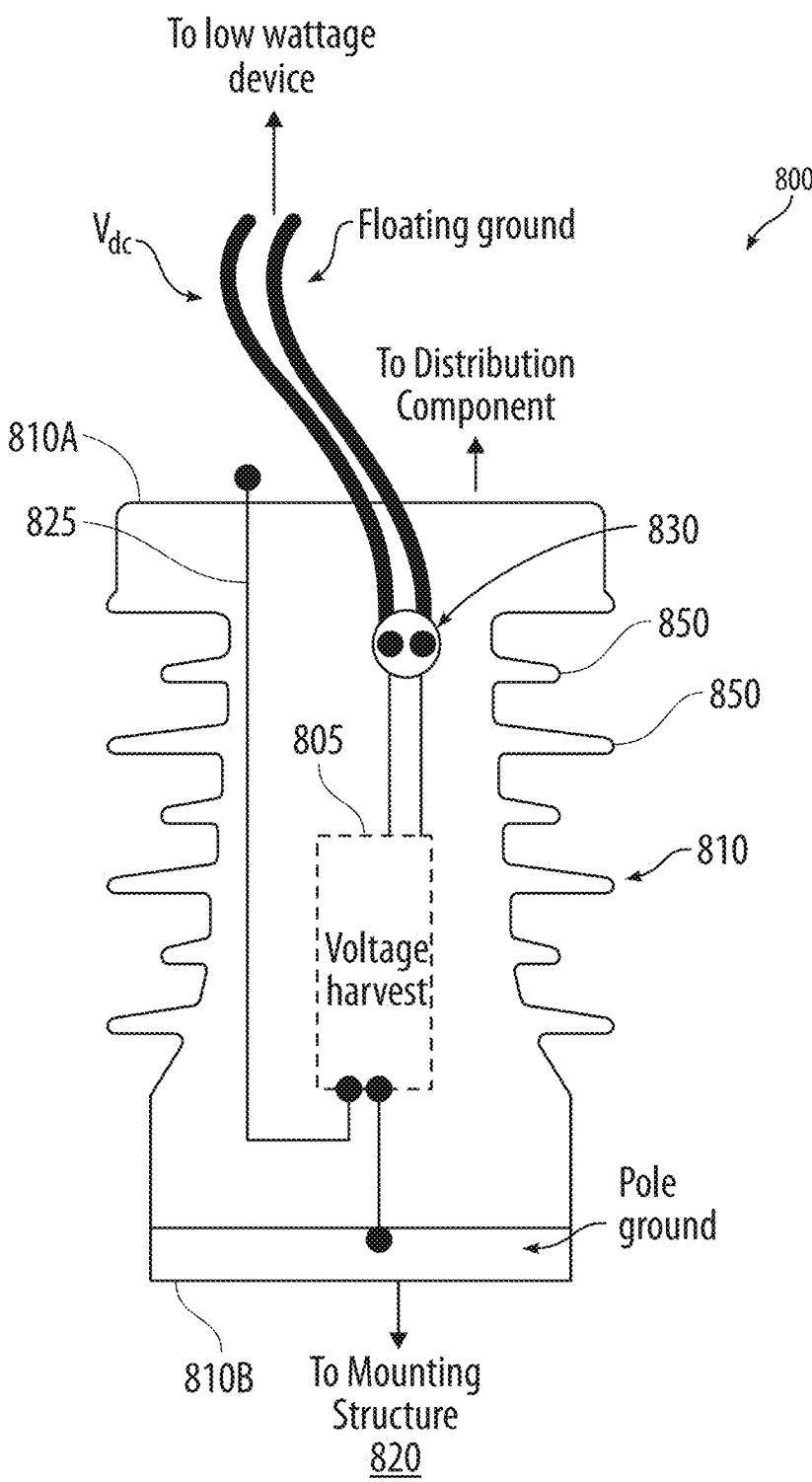
FIG. 9 is a block diagram of a voltage harvesting device, according to some aspects.

FIG. 7 is a flowchart illustrating a method, or process, 700 for manufacturing a vacuum interrupter, such as the vacuum interrupter 110, in accordance with the present disclosure. The process 700 includes applying a first dielectric material layer, such as the first layer 600, to an outer surface of the vacuum bottle 200 (block 705). In some instances, the process begins with first wrapping a silicone insulating jacket 1800 around the outer surface of the vacuum bottle 200 before applying the first dielectric material layer, such as the first layer 600. In such instances, the first dielectric material layer is then applied to an outer surface of the silicone insulating jacket 1800 wrapped around the outer surface of the vacuum bottle 200.

The process 700 proceeds with wrapping a first capacitor plate, such as the first cylindrical capacitor plate 225, around the vacuum bottle 200 (block 710). The process 700 also includes applying a second dielectric material layer around the vacuum bottle 200, for example, around the first cylindrical capacitor plate 225 (block 715) and wrapping a second capacitor plate, such as the second cylindrical capacitor plate 230, around the vacuum bottle 200 (block 715). In some instances, the process 700 includes the step of applying the second dielectric material layer around the first cylindrical capacitor plate 225 before the second cylindrical capacitor plate 230 is wrapped around the vacuum bottle 200, such that the second dielectric material layer is disposed between the first and second cylindrical capacitor plates 225, 230.

At block 725, the process 700 proceeds with enclosing the vacuum bottle 200, the first cylindrical capacitor plate 225, and the second cylindrical capacitor plate 230 in an insulating housing, such as the insulating housing. In some instances, the process 700 further includes applying a third dielectric material around the second cylindrical capacitor plate 230 before enclosing the vacuum bottle 200 and the first and second cylindrical capacitor plates 225, 230 with the insulating housing 125, such that the third dielectric material layer is disposed between the second cylindrical capacitor plate 230 and an inner surface of the insulating housing 125. In addition, the power distribution system type components and associated control devices contemplated by the present disclosure include, but are not limited to, line disconnects, fault interrupters, power line monitors, power factor correction devices, and load switching devices and other overhead distribution switches, insulators, and arresters. Non-limiting examples of line disconnects includes sectionalizers. Non-limiting examples of fault interrupters include breakers and reclosers. Non-limiting examples of power line monitors includes sensors and fault locators. Non-limiting examples of power factor correction devices include capacitor switches. Non-limiting examples of load switching devices include load-break switches. For ease of description, the power distribution system type components may also be referred to herein collectively as the "distribution components" in the plural and the "distribution component" in the singular.

Figure 10:
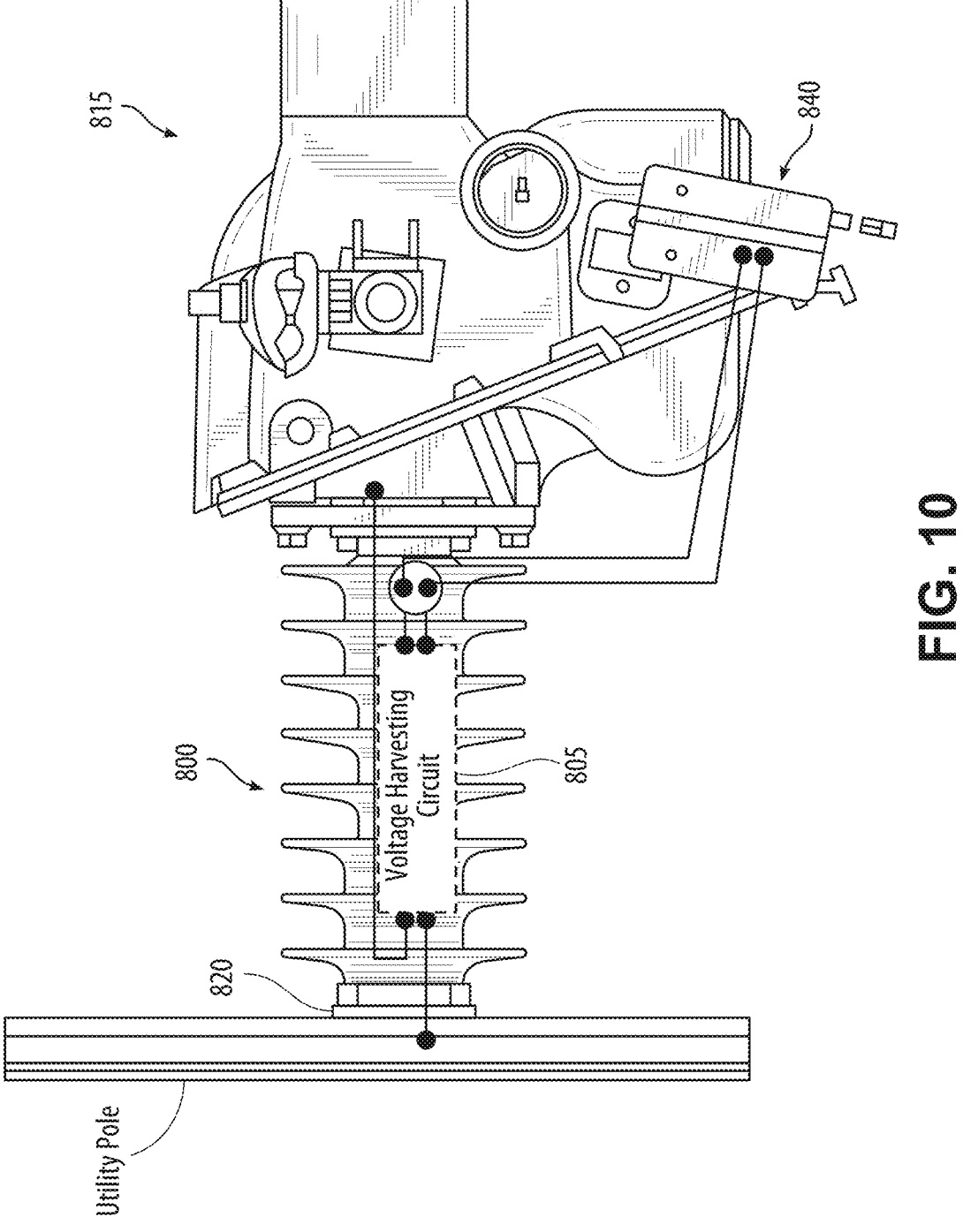
FIG. 10 is a perspective view of a voltage harvesting device installed on a distribution component, according to some aspects.
Figure 11:
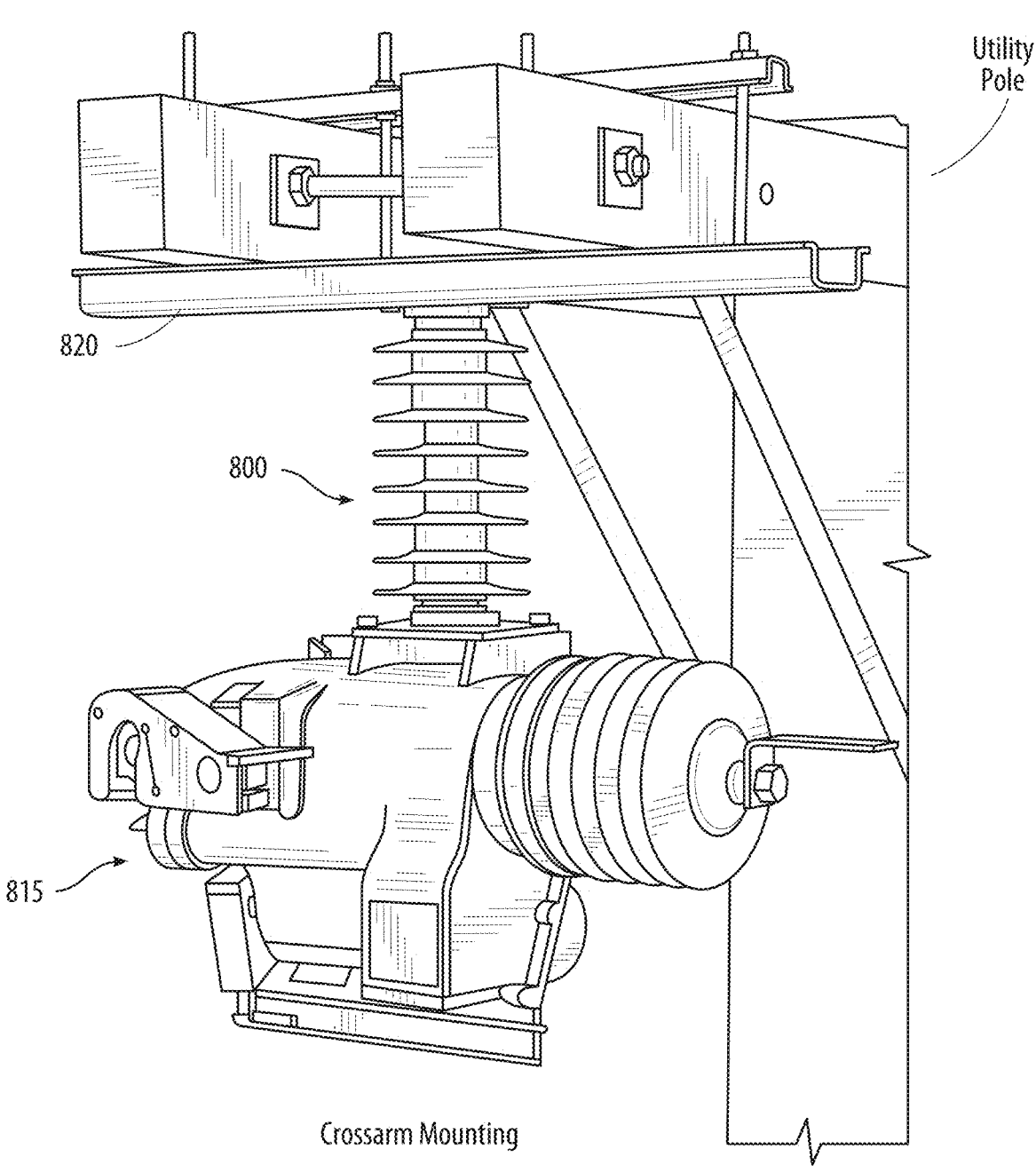
FIG. 11 is a perspective view of a voltage harvesting device installed on a distribution component, according to some aspects.
Figure 12:
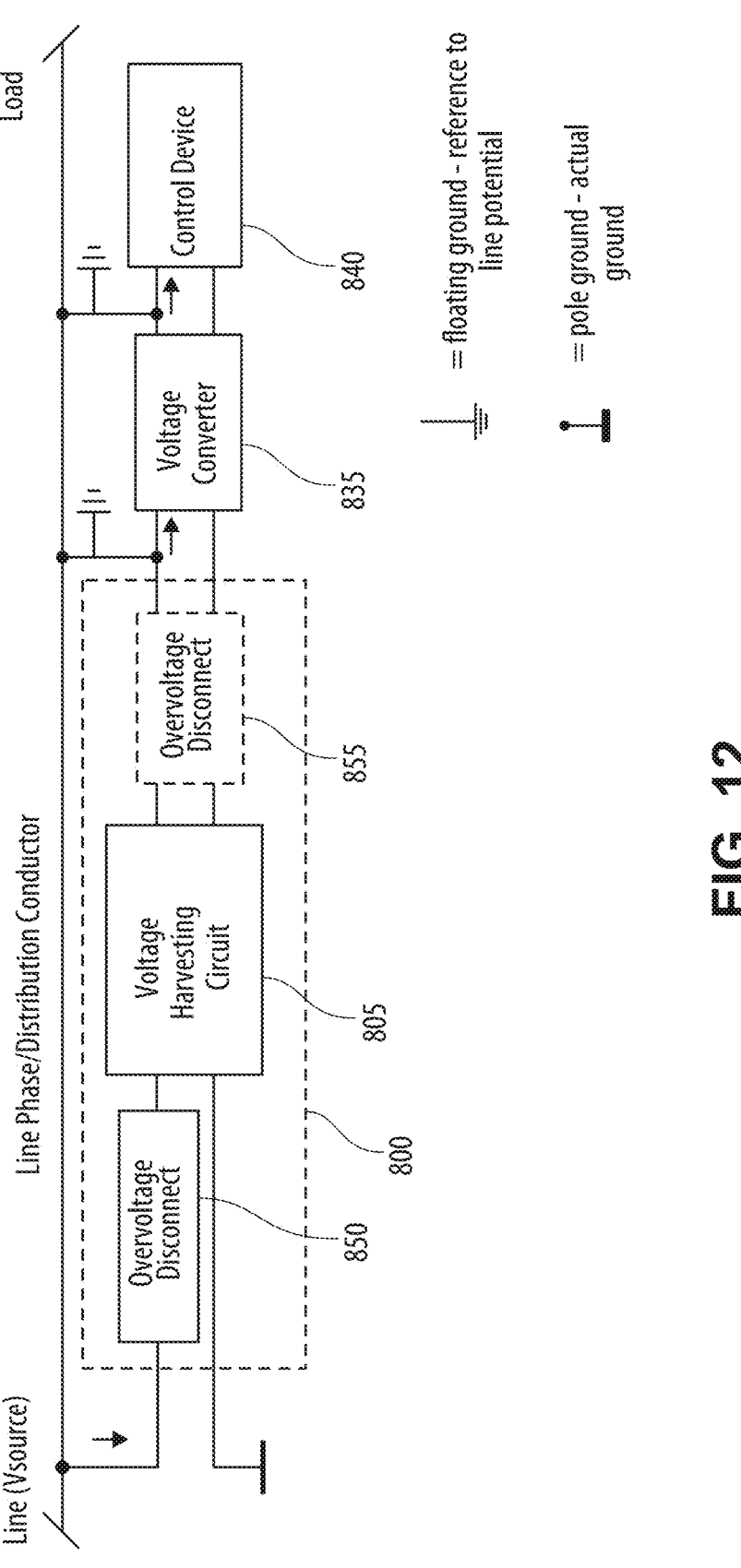
FIG. 12 is a block diagram of an example circuit including the voltage harvesting device of FIG. 8, according to some aspects.

Referring now to FIGS. 8-17, an example voltage harvesting device 800 according to another embodiment of the present disclosure is shown. The voltage harvesting device 800 includes a voltage harvesting circuit 805 the is enclosed in or encased in a housing 810. The housing 810 includes an upper surface 810A that permits a distribution component 815, e.g., a recloser, to be connected to the housing 810, as seen in FIGS. 10 and 11. The housing 810 further includes a lower surface 810B that permits the voltage harvesting device 800 to be connected to a mounting structure 820, as seen in FIGS. 10 and 11. A terminal connector 825 extends from the housing 810 and may be used to connect the input side of the voltage harvesting device 800 to the line voltage (Vsource). A terminal 830, e.g., a pin terminal, may also extend from the housing 810 and can be used to connect the output side of the voltage harvesting device 800 to a subsequent component, such as a voltage converter 835 and/or a control device 840, e.g., a low wattage control device, described below and seen in FIGS. 10-17.

The voltage harvesting circuit 805 of the voltage harvesting device 800 may be potted or otherwise formed in an insulating material used to construct the housing 810. Non-limiting examples of insulating materials include, cycloaliphatic epoxy, resin, polymer, porcelain and/or other insulating material known in the art that is durable, weather resistant and that allows for sufficient dissipation of heat generated by the voltage harvesting circuit 805, such as through sheds 850 of various diameters, seen in FIGS. 8 and 9. In some instances, the housing 810 is hollow, such that the voltage harvesting circuit 805 is contained within. In some instances, the housing 810 is mounted in other ways than what is illustrated in FIGS. 10 and 11. For example, in some instances, the housing 810 is mounted independently of the distribution component 815. For example, in such instances, the upper surface 810A of the housing 810 may be mounted to some other structure that is not the distribution component 815. Accordingly, in such instances, the lower surface 810B of the housing 810 and the distribution component 815 are separately mounted to the utility pole, for example, by respective mounting structures 820.

Figure 13:
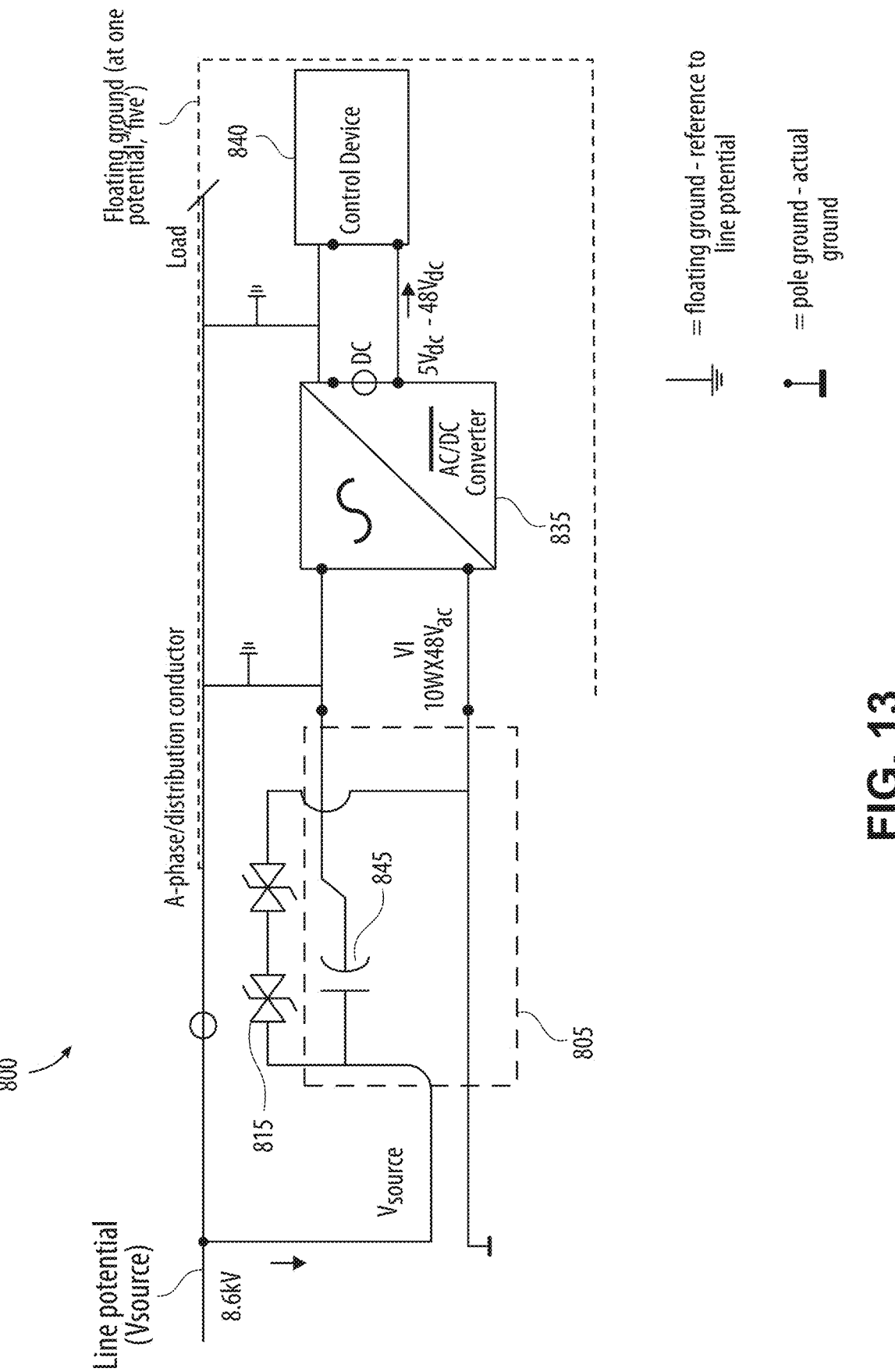
FIG. 13 is an example circuit diagram of the internal components of the circuit of FIG. 12, according to some aspects.
Figure 14:
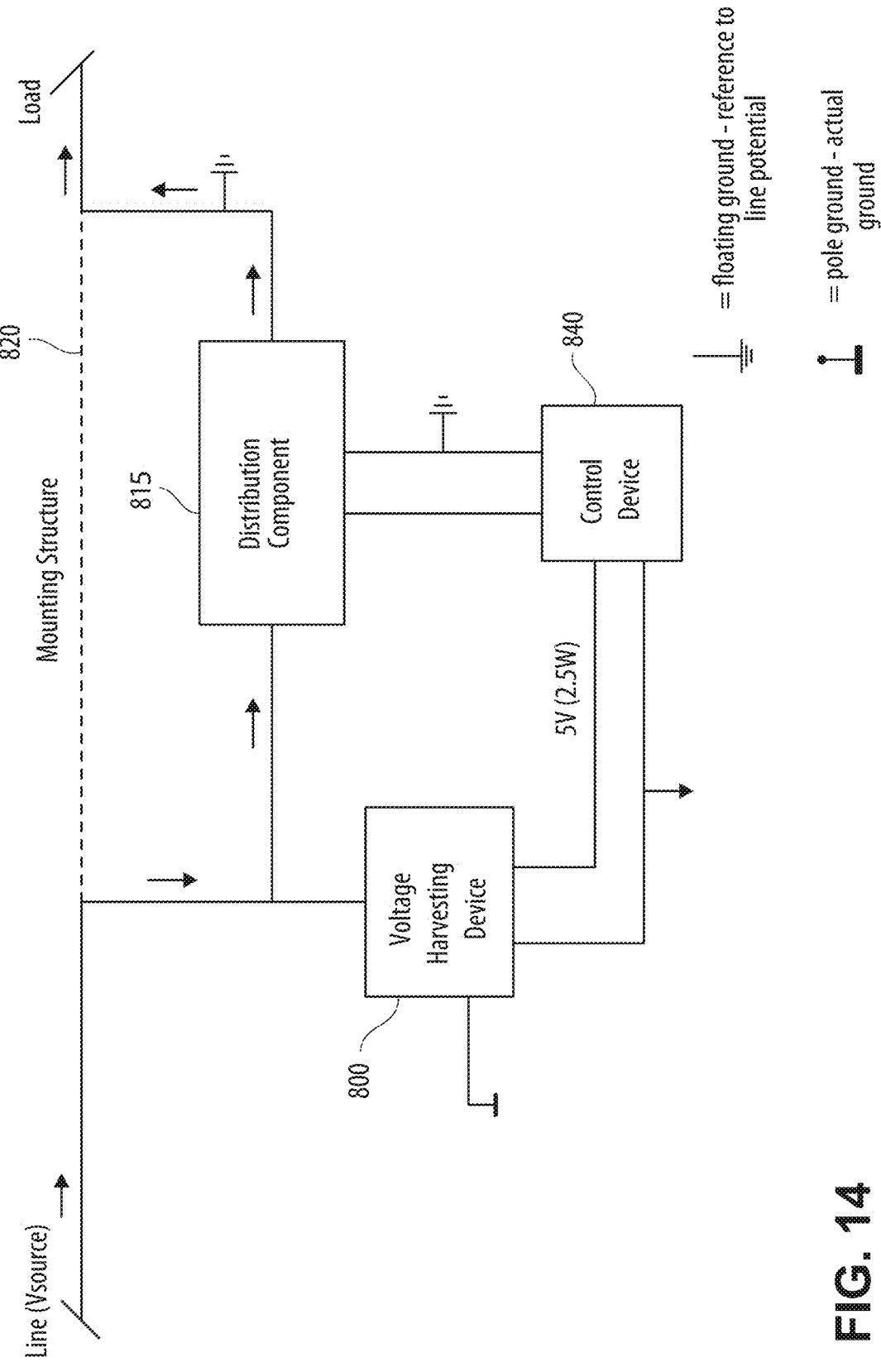
FIG. 14 is a block diagram of an example of a single-phase power distribution system including the voltage harvesting device of FIG. 8, according to some aspects.

Referring to FIGS. 13 and 14, the voltage harvesting circuit 805 is used to harvest power from high voltage transmission or distribution conductors to provide operating power for control devices, such as the control device 840. In some instances, the voltage harvesting circuit 805 is used to harvest power for a control device 840 when the distribution component 815, such as a recloser, is operated to interrupt a fault. That is, the voltage harvesting circuit 805 is used to power a control device 840 when a corresponding distribution component 815 is not conducting current. In some instances, the voltage harvesting circuit 805 is used to harvest power from high voltage transmission or distribution conductors to provide operating power for control devices, such as the control device 840 whether or not there is line current (load) on the high voltage distribution conductor. In the illustrated example of FIG. 13, the voltage harvesting circuit 805 includes, or is implemented as, a capacitor 845. For example, the capacitor 845 may be a high voltage capacitor such as a high voltage ceramic capacitor. In some instances, the voltage harvesting circuit 805 includes, or is implemented as, a plurality of high voltage capacitors connected in a series and/or parallel relationship.

As shown, the capacitor 845 is connected between the line voltage (Vsource) and an input to the voltage converter 835. In the illustrated example of FIG. 13, the capacitor 845 drops the line voltage (Vsource) by a large factor dependent on the source line voltage. For example, a kV single phase line voltage, or 8.66 kV, may be dropped by a factor ranging between about 7.5 kV to about 8.62 kV across the capacitor 845. That is, the voltage drop factor may range from about 95-99.6% of the single phase source voltage. In some instances, the voltage harvesting circuit 805, which includes the capacitor 845, outputs AC voltage at about 25V-250V to the input of the converter 835. In one example, if the line voltage (Vsource) fed to the capacitor 845 is about 8.66 kV, the voltage drop across the capacitor 845 will be about 8.6 kV such that the capacitor 845 outputs approximately 48 VAC at about 10 watts of power. It should be understood that for higher source line voltages, additional capacitors may be added in series and/or parallel to the voltage harvesting circuit 805 in order to accommodate the larger voltage drops and to handle the higher wattages.

In some instances, to protect the voltage harvesting device 800 from excessive voltages and transients, a first overvoltage disconnect device 854 may be connected to the input side of the voltage harvesting circuit 805. For example, in some instances, the first overvoltage disconnect device 854 may be connected between the line voltage (Vsource) and voltage harvesting circuit 805. In some instances, the first overvoltage disconnect device 854 may be connected between the line voltage (Vsource) and pole ground. The first overvoltage disconnect device 854 is provided to protect the voltage harvesting circuit 805 from overvoltage conditions, such as those caused by transients, faults or other disturbances on the line as is known in the art. Non-limiting examples of the first overvoltage disconnect device 854 include, daisy-chained transient-voltage-suppression (TVS) diodes, FETs, PTC fuses, and/or similar components and associated circuitry capable of providing overvoltage protection. In the illustrated example of FIG. 13, the first overvoltage disconnect device 854 is a series of daisy-chained TVS diodes or similar circuit connected between the line voltage (Vsource) and pole ground.

An optional second overvoltage disconnect device 855 may be connected to the output side of the voltage harvesting circuit 805, i.e., between the output of the capacitor 845 and subsequent circuitry coupled to the voltage harvesting device 800. The second overvoltage disconnect device 855 may be provided to protect the output side of the voltage harvesting circuit 805 from overvoltage conditions. Non-limiting examples of the second overvoltage disconnect device include, daisy-chained bidirectional TVS diodes, FETs, fuse, PTC fuses, diodes, and/or similar components and associated circuitry capable of providing overvoltage and overcurrent protection. In one example, the second overvoltage disconnect 855 may be included within the control device 840 instead of the voltage harvesting device circuitry.

To convert the output AC voltage (Vf) of the voltage harvesting circuit 805 (e.g., the capacitor 845) to a DC voltage for the control device 840, the voltage converter 835 is connected to the voltage harvesting device 800 or the optional second overvoltage disconnect device 855. In some instances, the voltage converter 835 is contained within the housing 810 of the voltage harvesting device 800. In such instances, the voltage harvesting device 900 outputs DC voltage to the control device 840. In other instances, the voltage converter 835 is positioned externally to the housing 810 of the voltage harvesting device 800. In some instances, the voltage converter 835 is included in the control device 840 that is being powered by the voltage harvesting device 800. The voltage converter 835 may be a conventional AC/DC converter or other device or circuitry capable for converting AC voltage to DC voltage. In the illustrated example of FIG. 13, the voltage converter 835 converts the 48 VAC output (Vf) from the capacitor 845 to provide a 48 VDC operating voltage for the control device 840. In the illustrated examples of FIGS. 14 and 15, the voltage converter 835 converts the 48 VAC output voltage (Vf) from the capacitor 845 to provide a 5 VDC operating voltage at 2.5 watts for the control device 840. In some instances, the voltage converter 835 is implemented as the rectifier 400 described above with respect to FIGS. 1-7.

In one example, the circuit of FIG. 13 supplied with a line voltage (Vsource) of 8.66 kV AC operates in the following manner. The line voltage (Vsource) is fed into the voltage harvesting circuit 805 that includes the capacitor 845. The circuit ground is earth ground, via e.g., a utility pole ground. The voltage drop across the capacitor 845 reduces the 8.66 kV to a voltage (Vf) of about 48 VAC at about 10 W.

It is noted that in the configuration shown, the output of the capacitor 845 is held at line potential, acting as floating ground reference. As a result, the output of the capacitor 845 (Vf) is approximately 8708V. However, with the floating ground being at approximately 8.66 kV the effective output voltage of the capacitor 845 is about 48 VAC. Thus, the additional step 'up' from the line voltage potential is what achieves the voltage harvesting from the line potential whether or not there is a load present on the line. The output voltage (Vf) of the capacitor 845, e.g., the 48 VAC, is then input into the AC to DC converter 835 which can have characteristics that convert the 48 VAC to the same or a lower DC voltage so that the converter outputs a DC voltage for a prescribed application as is known. For example, to power a control device 840 that is a communication radio for a recloser as the distribution component 815, approximately 5 VDC at 2.5 W may be required. In such an example, the voltage converter 835 would be configured to convert the 48 VAC at about 10 W to 5 VDC at about 2.5 W. The 5 VDC at about 2.5 W output of the voltage converter 835 is then fed into the communication radio 840, also sitting at line potential, to continuously power the communication radio 840 whether or not a load current is present on the line.

As noted above, in the event line voltage exceeds a certain threshold, e.g., 95 kV, the first overvoltage disconnect device 854 would short to effectively disconnect the voltage harvesting circuit 805 from the line overvoltage condition. This overvoltage value may be higher or lower depending on, for example, the corresponding rated line voltage (Vsource) where the voltage harvesting device 800 is being utilized. As noted above, in the event the output side of the capacitor 845 exceeds a certain threshold, e.g., 50V to 8.6 kV, the second overvoltage disconnect device 855 would short to effectively disconnect the capacitor 845 from the output side overvoltage condition. The second overvoltage disconnect 855 includes a range of values that depend on, for example, the nominal line voltage of the line on which it is utilized and the output voltage being supplied to the converter. The second overvoltage disconnect serves to protect the additional components, i.e., the AC/DC converter 835 and control device 840 in the case where the capacitor 845 fails or in the case of an overvoltage event on the line which effectively raises the 'ground' line potential of the circuit.

Referring again to FIGS. 8 and 9, an example of the housing 810 of the voltage harvesting device 800 is shown. The housing 810 may come in various shapes and sizes depending upon a number of factors, including the components, e.g., the capacitor 845, used in the voltage harvesting circuit 805, the source line voltage (Vsource), the desired output voltage of the voltage harvesting circuit 805, and the desired output power of the voltage harvesting circuit 805. As a non-limiting example, the dimensions of the housing 810 may range from about 12"×5"×5" to about 15"×8"×8" or larger, dependent on the dimensions of the capacitor 845 and/or any other components that may be contained in the housing 810. For example, in some instances, in addition to the voltage harvesting circuit 805, which includes the capacitor 845, one or more of the voltage converter 835, first overvoltage disconnect 854, and/or the second overvoltage disconnect 855 may also be contained in the housing 810. Accordingly, in such instances, the size of the housing 810 may be increased to accommodate the one or more additional components. In some instances, the housing 810 is hollow. In some instances, the housing 810 is much smaller than the above-listed dimensions, such as about 6"×3"×3".

Figure 15:
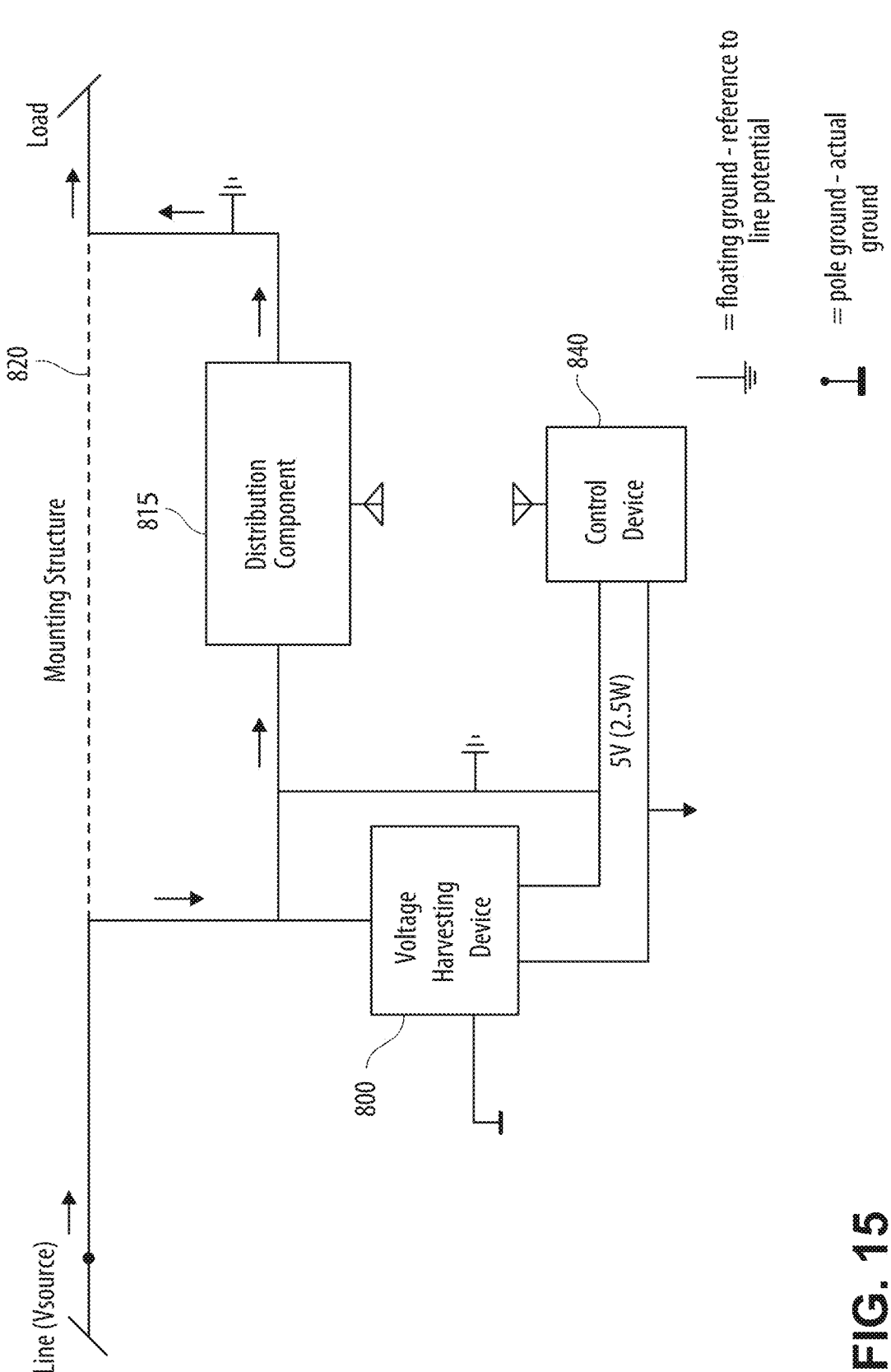
FIG. 15 is a block diagram of an example of a single-phase power distribution system including the voltage harvesting device of FIG. 8, according to some aspects.

Referring to FIGS. 14 and 15, examples of a single-phase power distribution system architecture incorporating the voltage harvesting device 800 according to the present disclosure are shown. In the illustrated example of FIG. 14, the distribution component 815 is a recloser, the control device 840 is a recloser peripheral device, such as a communication module, and the voltage harvesting device 800 includes one of the embodiments shown in FIGS. 8-13. The voltage harvesting device 800 can be mounted to a utility pole and the recloser 815 can be mounted to one end of the voltage harvesting device 800, as seen in FIGS. 10 and 11. The voltage harvesting device 800 is connected to the line phase conductor having a line voltage (Vsource), e.g., an 8.66 kV source line voltage. When triggered, the recloser 815 would open, disconnecting the load from the line voltage (Vsource). Whether the recloser 815 is closed or open, the line voltage (Vsource) is fed to the voltage harvesting device 800 from the source side, which drops the line voltage (Vsource), e.g., the 8.66 kV to 48 VAC at 10 watts, and the voltage converter 835 converts the 48 VAC to 5 VDC at 2.5 watts. The 5 VDC at 2.5 watts is output by the converter 835 and fed to the recloser communication module 840 which can be used to communicate and power a control element for the operation of the recloser 815 via an interface, such as a serial port or hardwire connection, or wireless connection (see, FIG. 15) between the recloser communication module 840 and the recloser 815. In one example, the communication module 840 can be utilized to provide power to charge capacitors or other energy storage elements in the recloser in order to perform functions, such as closing or opening the device after an open circuit or unloaded condition.

In the illustrated example of FIG. 15, the distribution component 815 is a recloser, the control device 840 is a recloser wireless communication and/or control device, such as an RTU. The voltage harvesting device 800 can be mounted to a utility pole and the recloser 815 can be mounted to one end of the voltage harvesting device 800, as seen in FIGS. 10 and 11. The voltage harvesting device 800 is connected to a single phase line conductor having a line voltage (Vsource), e.g., an 8.66 kV line voltage. When triggered, the recloser 815 would open, disconnecting the load from the line voltage (Vsource). Whether the recloser 815 is closed or open, the source line voltage (Vsource) is fed to the voltage harvesting device 800 which drops the line voltage (Vsource), e.g., the 8.66 kV, to 48 VAC at 10 watts and the voltage converter 835 converts the 48 VAC to 5 VDC at 2.5 watts. The 5 VDC at 2.5 watts is output by the voltage converter 835 and fed to the communication and/or control device 840 which may control the operation of the recloser 815 via wireless communication between the communication and/or control device 840 and the recloser 815 using known communication techniques and protocols. In another example described with reference to FIG. 15, the control device 840 may be independent of the distribution component 815 or may be a distribution component itself, having additional circuitry within it to communicate and transmit or indicate data regarding line conditions.

Figure 16:
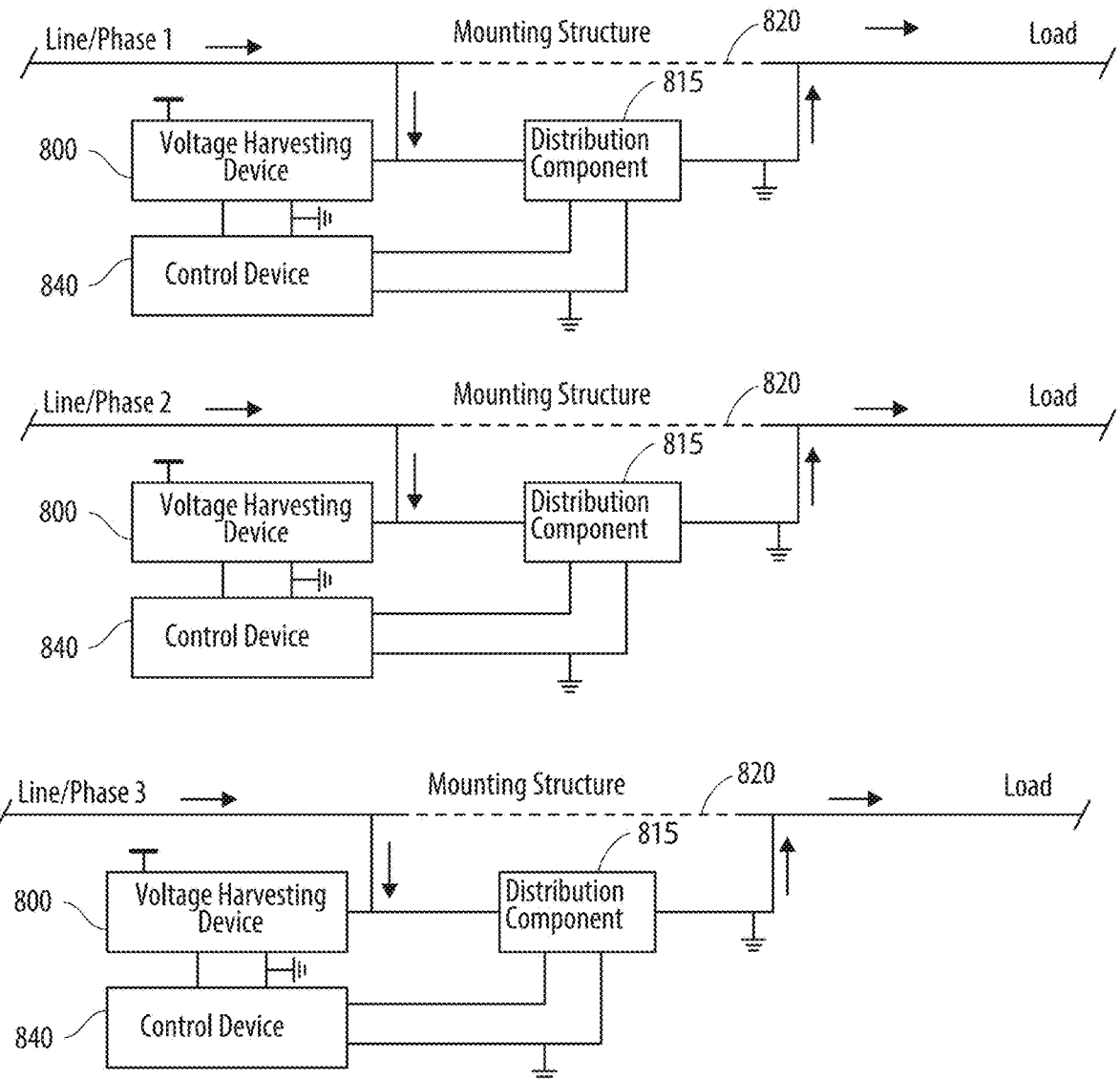
FIG. 16 is a block diagram of an example of a three-phase power distribution system including the voltage harvesting device of FIG. 8, according to some aspects.
Figure 17:
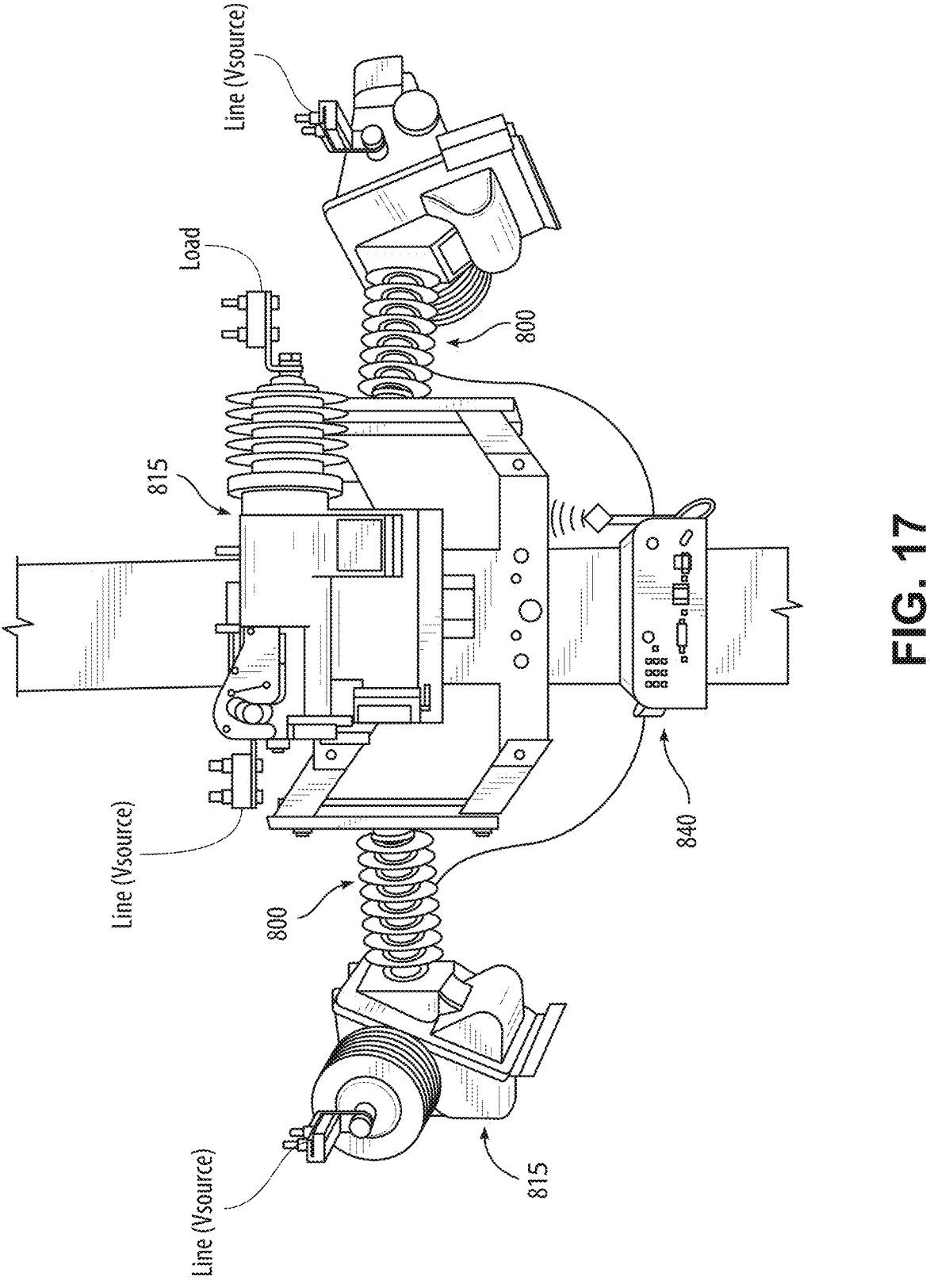
FIG. 17 is perspective view of a three-phase power distribution system including the voltage harvesting device of FIG. 8, according to some aspects.

Referring to FIGS. 16 and 17, an example of a three-phase power distribution system architecture incorporating the voltage harvesting device 800 according to the present disclosure is shown. In this exemplary embodiment, each phase (1, 2, or 3) of a three-phase line is fed into a separate voltage harvesting device 800, the output of which is fed to a separate control device 840, such as an RTU, which controls one or more separate distribution components 815 similar to that shown in FIGS. 14 and 15 and described above. In the illustrated example of FIG. 16 the control devices 840 are hardwired to the distribution component 815. In the illustrated example of FIG. 17 a control device 840 (e.g., an RTU) wirelessly communicates with multiple distribution components 815 and is powered via one or more of the voltage harvesting devices 800 on each of the multiple distribution components 815.

The voltage harvesting device according to the present disclosure may be used with live ungrounded devices or with pole-based control devices, which are usually grounded. It will be understood that various modifications can be made to the embodiments of the present disclosure without departing from the spirit and scope thereof. All values set forth herein are exemplary and can be modified depending upon the line voltage (Vsource) and line continuous wattage, the voltage and power requirements of the control device, and the characteristics and properties of the voltage harvesting device. This includes the values for the physical dimensions and the resistance and power characteristics of the resistor and transformer and other elements used with or incorporated into the voltage harvesting device, such as the overvoltage disconnects and the voltage converter. Additionally, though the voltage harvesting circuit within the voltage harvesting device may only include the transformation circuit, i.e., the resistor/transformer voltage divider, the voltage harvesting circuit may also include other elements, such as the first overvoltage disconnect device, the second overvoltage disconnect device and/or the voltage converter. Therefore, the above description should not be construed as limiting the disclosure, but merely as embodiments thereof. Those skilled in the art will envision other modifications within the scope and spirit of the invention as defined by the claims appended hereto.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

uum interrupter.

What is claimed is:

1. A circuit interrupting device comprising:
a vacuum interrupter including
a vacuum bottle, and
a first contact and a second contact disposed within the vacuum bottle, the second contact movable relative to the first contact between a closed position and an open position;
a cylindrical capacitor electrically connected in parallel with the vacuum interrupter and wrapped around an outer surface of the vacuum bottle, wherein the cylindrical capacitor includes a first cylindrical capacitor plate and a second cylindrical capacitor plate, the second cylindrical capacitor plate being radially outside the first cylindrical capacitor plate, wherein the cylindrical capacitor further includes a first dielectric material layer that is disposed between the outer surface of the vacuum bottle and the first cylindrical capacitor plate; and
an insulating housing that encloses the capacitor and the vacuum interrupter.

2. The circuit interrupting device of claim 1, wherein the capacitor further includes a second dielectric material layer that is disposed between the first and second cylindrical capacitor plates.

3. The circuit interrupting device of claim 2, wherein the capacitor further includes a third dielectric material layer that is disposed between the second cylindrical capacitor plate and an inner surface of the insulating housing.

4. The circuit interrupting device of claim 1, further comprising:
an insulating jacket disposed on the outer surface of the vacuum bottle, wherein the capacitor is wrapped around the insulating jacket.

5. The circuit interrupting device of claim 1, wherein the insulating housing includes:

a first surface for connecting the insulating housing to a power distribution component; and a second surface for connecting the insulating housing to a mounting structure that is coupled to a utility pole, wherein the capacitor is electrically connected between an alternating current (AC) line voltage source and a converter.

6. The circuit interrupting device of claim 5, further comprising:

a first overvoltage disconnect component electrically connected between the AC line voltage source and actual ground.

7. A recloser comprising:

a terminal configured to electrically connect the recloser to a power line included in a power distribution network;

one or more electronic components;

a vacuum interrupter electrically connected between the terminal and the one or more electronic components, the vacuum interrupter including a first contact and a second contact movable relative to the first contact between a closed position and an open position;

a cylindrical capacitor electrically connected in parallel with the vacuum interrupter, wherein the cylindrical capacitor includes a first cylindrical capacitor plate and a second cylindrical capacitor plate, the second cylindrical capacitor plate being radially outside the first cylindrical capacitor plate, wherein the cylindrical capacitor further includes a first dielectric material layer that is disposed between the outer surface of the vacuum interrupter and the first cylindrical capacitor plate; and an insulating housing that encloses the cylindrical capacitor and the vacuum interrupter.

8. The recloser of claim 7, wherein the cylindrical capacitor surrounds the first and second contacts.

9. The recloser of claim 7, further comprising:

a current transformer configured to provide power to the one or more electronic components with power from the power line when the first and second contacts are in the closed position; and a harvester circuit configured to provide power to the one or more electronic components with power from the cylindrical capacitor when the first and second contacts are in the open position.

10. The recloser of claim 9, wherein the harvester circuit includes:

a rectifier configured to convert alternating current (AC) power flowing through the cylindrical capacitor into direct current (DC) power output; and an electrolytic capacitor that is configured to provide the DC power output by the rectifier to the one or more electronic components.

11. The recloser of claim 10, wherein the harvester circuit further includes a zener diode electrically connected in parallel with the electrolytic capacitor; and wherein the electrolytic capacitor outputs DC power to the one or more electronic components at a voltage level that is approximately equal to a breakdown voltage of the zener diode.

12. A method of manufacturing a vacuum interrupter including a vacuum bottle enclosing first and second contacts, the method comprising:

applying a first dielectric material layer to an outer surface of the vacuum bottle;

wrapping a first capacitor plate around the vacuum bottle;

wrapping a second capacitor plate around the vacuum bottle; and enclosing the vacuum bottle, the first capacitor plate, and the second capacitor plate in an insulating housing.

13. The method of claim 12, further comprising:

applying a second dielectric material layer between the first and second capacitor plates; and applying a third dielectric material layer between the second capacitor plate and the insulating housing.

14. The method of claim 12, wherein the first dielectric material layer is disposed between the vacuum bottle and the first capacitor plate.

15. The method of claim 12, wherein the first and second capacitor plates are electrically connected in parallel with the vacuum bottle.

16. The method of claim 12, further comprising:

providing an insulating jacket around the outer surface of the vacuum bottle, wherein the first dielectric material layer is applied to the insulating jacket.

17. A circuit interrupting device comprising:

a vacuum interrupter including a vacuum bottle, and a first contact and a second contact disposed within the vacuum bottle, the second contact movable relative to the first contact between a closed position and an open position;

a cylindrical capacitor electrically connected in parallel with the vacuum interrupter and wrapped around an outer surface of the vacuum bottle; and an insulating housing that encloses the capacitor and the vacuum interrupter, wherein the cylindrical capacitor includes a first cylindrical capacitor plate, a second cylindrical capacitor plate, a first dielectric material layer that is disposed between the outer surface of the vacuum bottle and the first cylindrical capacitor plate, a second dielectric material layer that is disposed between the first and second cylindrical capacitor plates, and a third dielectric material layer that is disposed between the second cylindrical capacitor plate and an inner surface of the insulating housing.

* * * * *